(12) United States Patent
Brescia (10) Patent No.: US 7,780,383 B2
(45) Date of Patent: Aug. 24, 2010

(54) LOCKING SYSTEM FOR ROLL-OFF CONTAINERS WITH A POSITIVE UNLOCKING MECHANISM TO PREVENT BINDING

(75) Inventor: Leonard Brescia, Boylston, MA (US)

(73) Assignee: Wastequip Manufacturing Company, Beachwood, OH (US)

( * ) Notice: Subject to any disclaimer, the term of this patent is extended or adjusted under 35 U.S.C. 154(b) by 412 days.

(21) Appl. No.: 11/974,450

(22) Filed: Oct. 12, 2007

(65) Prior Publication Data

US 2009/0095866 A1   Apr. 16, 2009

(51) Int. Cl.
*B60P 7/08* (2006.01)
*B60P 7/13* (2006.01)

(52) U.S. Cl. .......................................... 410/80; 410/94

(58) Field of Classification Search .................... 410/77, 410/80, 84, 85, 90, 101, 69; 292/95, 194, 292/99, 198, 341.17
See application file for complete search history.

(56) References Cited

U.S. PATENT DOCUMENTS

| | | | | |
|---|---|---|---|---|
| 1,649,598 A * | 11/1927 | Kirchner | ...................... | 410/79 |
| 2,351,314 A * | 6/1944 | Stephania | .................... | 410/67 |
| 2,424,429 A * | 7/1947 | Bamberg | .................... | 414/544 |
| 2,427,603 A * | 9/1947 | Higgins | ........................ | 410/80 |
| 2,944,492 A * | 7/1960 | Deodat | ......................... | 410/65 |
| 5,494,386 A * | 2/1996 | Paull | ............................. | 410/77 |
| 5,618,138 A * | 4/1997 | Lockhart | ..................... | 410/69 |
| 6,053,692 A | 4/2000 | Mason et al. | | |
| 6,315,508 B1 * | 11/2001 | Nadon | ......................... | 410/80 |
| 6,695,553 B1 | 2/2004 | Galbreath et al. | | |
| 6,736,585 B2 * | 5/2004 | O'Daniel | .................... | 414/498 |
| 2008/0129057 A1 * | 6/2008 | Talbot et al. | .................. | 292/99 |
| 2008/0170925 A1 * | 7/2008 | Marmur | ....................... | 410/80 |
| 2009/0095866 A1 * | 4/2009 | Brescia | ....................... | 248/313 |

* cited by examiner

*Primary Examiner*—Patricia L Engle
(74) *Attorney, Agent, or Firm*—Weingarten, Schurgin, Gagnebin & Lebovici LLP (57) ABSTRACT

A locking system for locking a container to a vehicle includes a locking assembly mounted to a hoist frame and a striker assembly mounted to the vehicle chassis. The locking assembly has at least one hook for hooking over a frame member of the container. The hook has a center of mass that biases the hook to an unlocked position. The striker assembly strikes the hook at a location to move the hook against the bias of the hook's center of mass into a locked position in which the hook is hooked over the frame member of the container. As the hoist frame supporting the container is lowered, the striker assembly contacts the hook and rotates the hook against the bias of the hook's center of mass into the locked position. As the hoist frame is raised, the hook rises as well and loses contact with the striker assembly, thereby falling away from the hoist frame and unlocking the container. A positive or mechanical unlocking mechanism prevents the hooks from binding to the container.

4 Claims, 7 Drawing Sheets

LOCKING SYSTEM FOR ROLL-OFF CONTAINERS WITH A POSITIVE UNLOCKING MECHANISM TO PREVENT BINDING

CROSS REFERENCE TO RELATED APPLICATIONS

N/A

This application is related to U.S. patent application Ser. No. 11/634,346, filed Dec. 5, 2006, entitled Locking System for Roll-Off Containers, the disclosure of which is incorporated by reference herein.

STATEMENT REGARDING FEDERALLY SPONSORED RESEARCH OR DEVELOPMENT

N/A

BACKGROUND OF THE INVENTION

Some trucks have containers that roll off and on the truck bed. Typical roll-off trucks have a pair of rails that extend along the truck bed and pivot upwardly creating a ramp on which a container rolls on or off, aided by a cable hoist system or a hydraulic hook for loading or unloading the container.

Roll-off containers must have a secondary locking system that is engaged during transport. Typically, containers are secured with straps, chains, or a powered automatic locking system. These systems require an operator to perform some activity before loading or unloading a container. It is possible for an operator to forget to attach the straps or chains or to activate the power lock before driving off. Also, if the operator were to forget to remove the straps or chains or to deactivate the power lock before rolling the container off, damage to the container, hoist, truck, or locking device could occur.

SUMMARY OF THE INVENTION

A locking system for locking a container to a vehicle is provided that requires no action by the operator. The locking system locks the container down as the hoist frame rails are lowered and unlocks the container as the hoist frame rails are lifted.

The locking system includes a locking assembly mounted to a rail of the hoist frame. The locking system has at least one hook for hooking over a frame member of the container. The hook has a center of mass located to bias the hook to an unlocked position. A striker assembly includes a striker element disposed to strike the hook at a location to move the hook against the bias of the hook's center of mass to a locked position in which the hook is hooked over the frame member of the container. As the hoist frame rail supporting the container is lowered, the striker element contacts the hook and rotates the hook against the bias of the hook's center of mass into the locked position. As the hoist frame rail is raised, the hook rises as well and loses contact with the striker element, thereby falling away from the hoist frame rail and unlocking the container.

A positive or mechanical unlocking mechanism is provided to prevent binding of the hook to the container during lifting of the container. The mechanism includes a pull down device that operates automatically to exert a downward force on a hook, without the need for additional power.

A keeper element engages the striker element in the locked position to prevent the striker element from falling out of contact with the hook, for example, when the vehicle is driven over rough terrain.

DESCRIPTION OF THE DRAWINGS

The invention will be more fully understood by reference to the following detailed description when considered in conjunction with the accompanying drawings, in which.

DETAILED DESCRIPTION OF THE INVENTION

Figure 1:
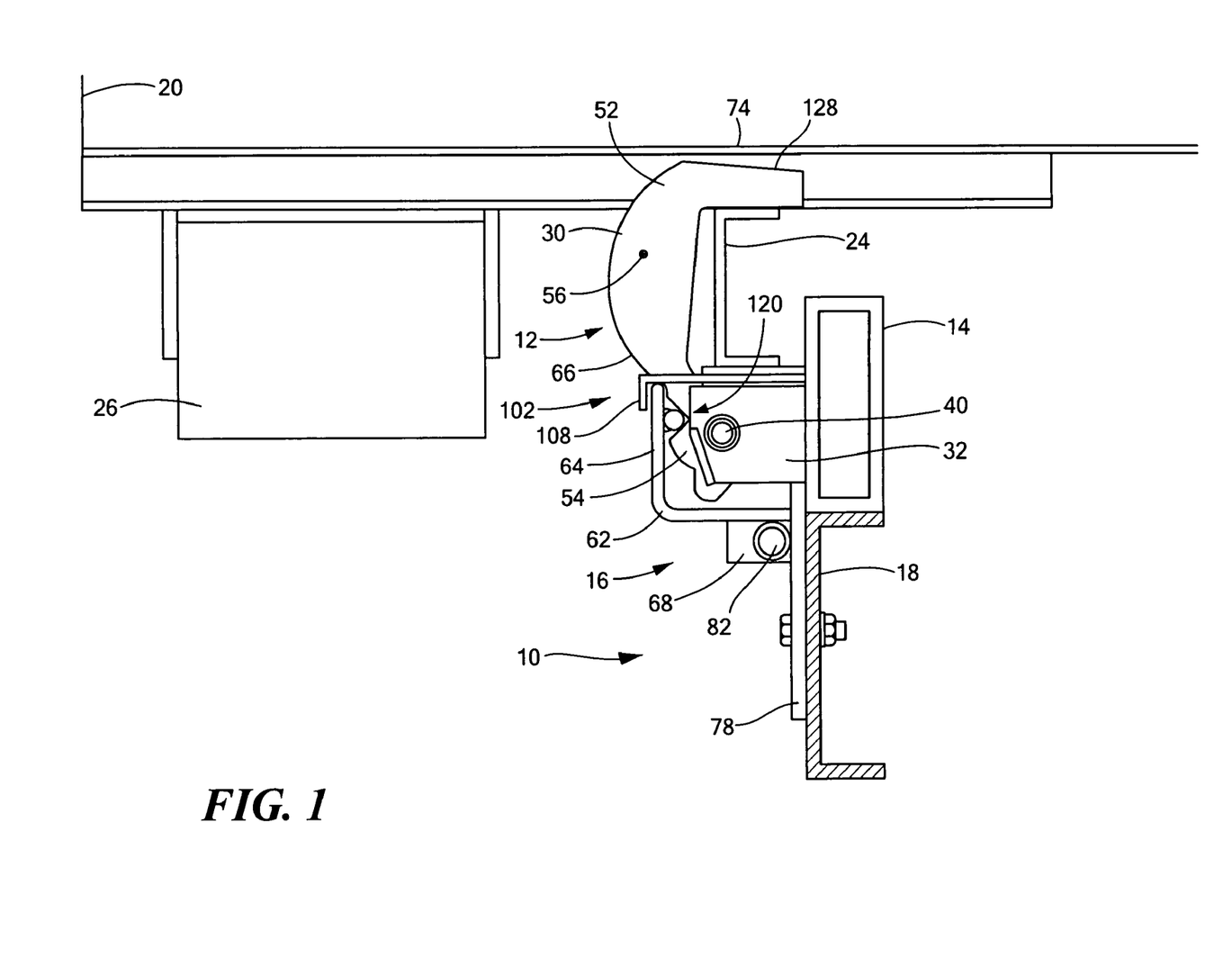
FIG. 1 is a side view of an embodiment of a locking system for roll-off containers in a locked position.

An embodiment of a locking system for a roll-off container is illustrated in FIG. 1. The locking system 10 includes a locking assembly 12 mounted to a hoist frame rail 14 and a striker assembly 16 mounted to a vehicle chassis 18 to retain the locking assembly in a locked position on a container 20. The striker assembly 16 remains stationary with the vehicle chassis, while the locking assembly 12 is raised or lowered with the hoist frame rail 14 as the container is loaded or unloaded. Hoist rollers 22 are mounted to the hoist frame rail 14. A container frame member 24 is supported on the hoist rollers. When the hoist frame rails are tilted up (only one rail is shown), the container rolls on or off along the hoist rollers under the control of a cable hoist system or the like. Container rollers 26 allow the container to roll on the ground.

The locking assembly 12 includes at least one and preferably two hooks 30 that are pivotably mounted to the rail 14. In a locked position, the hooks hook over a portion of the container, such as a frame member 24. Each hook has a center of mass 56 located to bias the hook to an unlocked position rotated away from the container frame member 24. The striker assembly 16 includes a striker element 62 associated with each hook that strikes the hook along an outer edge of the hook. As the hoist frame rail 14 supporting the container is lowered, the striker element contacts the hook and rotates the hook against the bias of the hook's center of mass into the locked position.

In use, a first locking system 10 is provided on one side of the vehicle and a second locking system is provided on the opposite side of the vehicle, so that the container is locked to the vehicle on both sides. Only one locking system is illustrated in the figures herein, the other locking system preferably being substantially the same.

Figure 2:
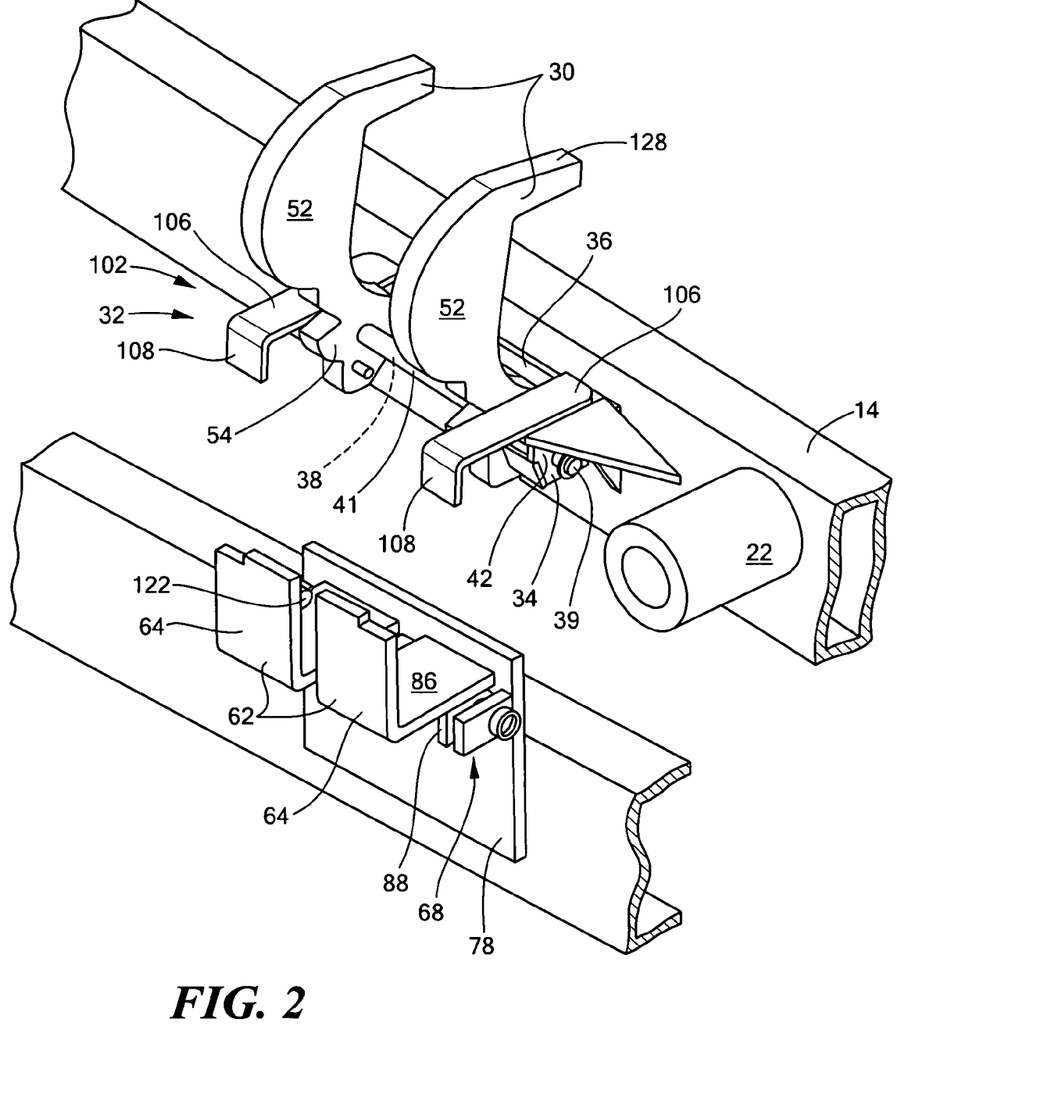
FIG. 2 is an exploded isometric view of the locking system of FIG. 1.
Figure 3:
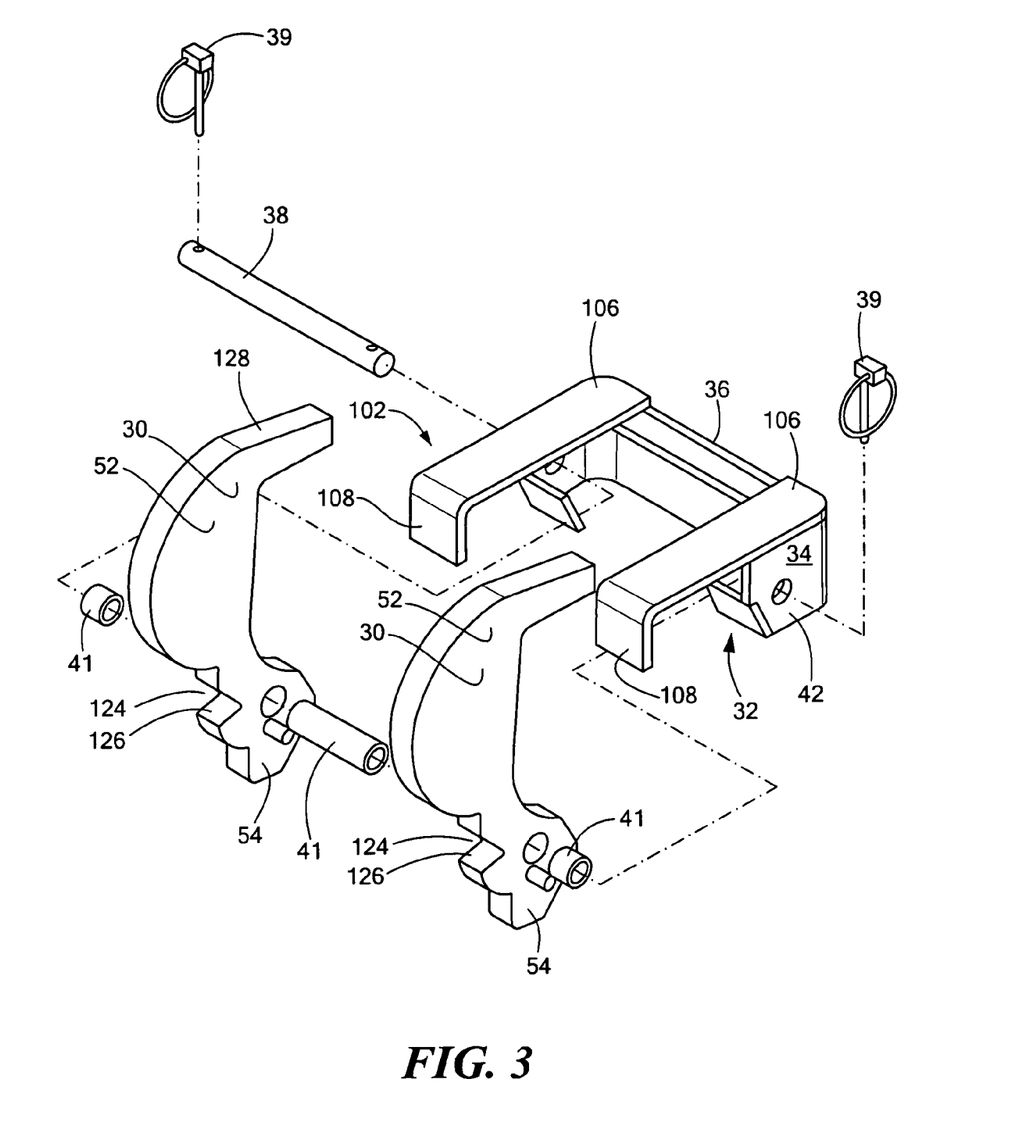
FIG. 3 is an exploded isometric view of the locking assembly of the locking system of FIG. 1.
Figure 6A:
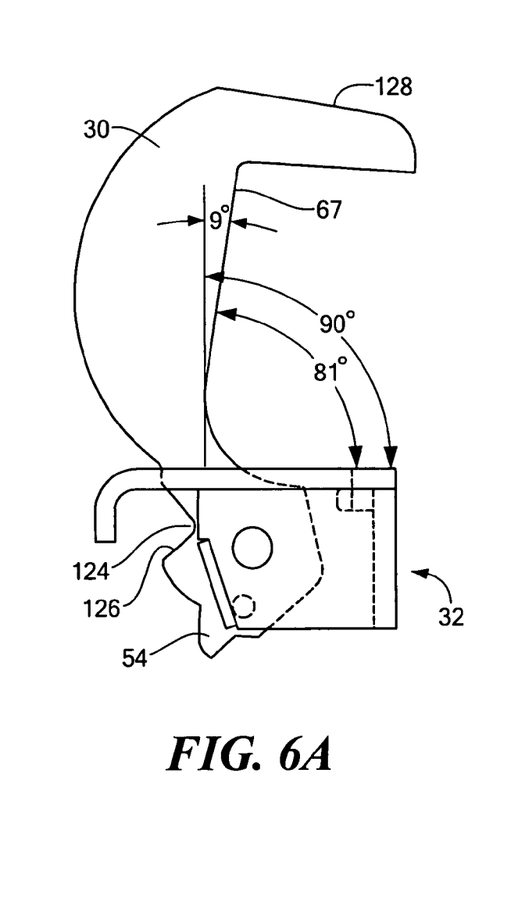
FIGS. 6A and 6B illustrate the range of rotation of the hooks of the locking system of FIG. 1.
Figure 6B:
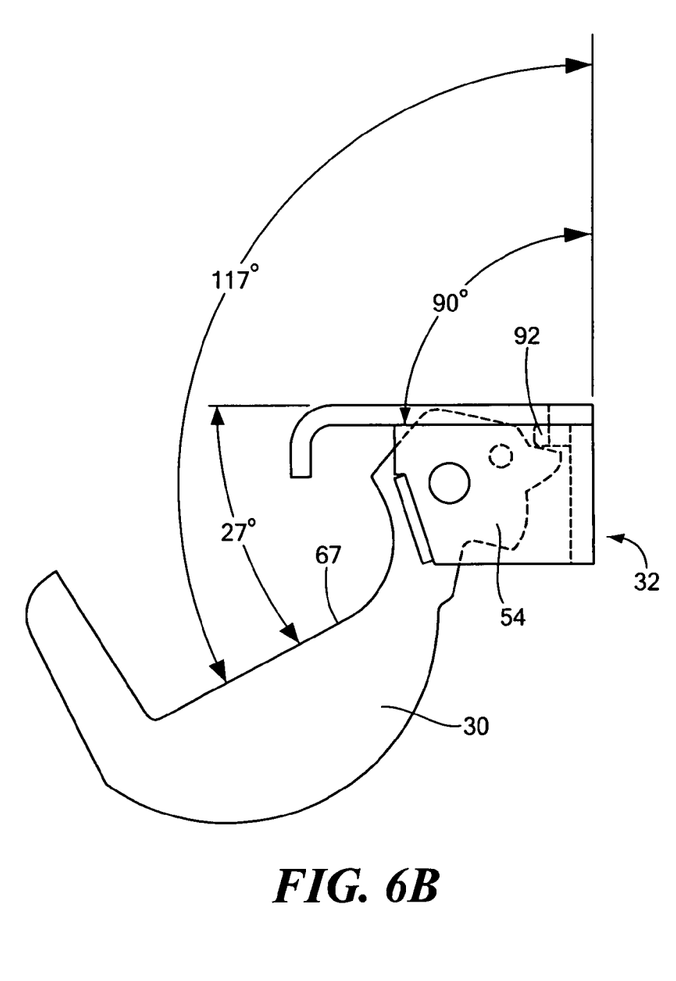

More particularly in the embodiment illustrated, the locking assembly includes two hooks 30 that are pivotably mounted via a mounting mechanism 32 (FIGS. 2, 3) to the rail 14. The mounting assembly includes a hook housing 34 having a back plate 36 mounted to the rail in any suitable manner, such as by bolts or welding. A hook pivot pin 38 is attached to the hook housing in any suitable manner. For example, flanges 42 extend from the back plate 36 at suitable locations, such as the sides, and the hook pivot pin 38 extends through openings in the side flanges to define a pivot point 40. The pivot pin is retained by spring clip pins 39, and spacers 41 keep the hooks axially in place on the pivot pin. Each hook 30 includes a hook arm 52 that fits over the frame member 24 of the container 20. Each hook also includes a mounting base 54 that has an opening therein through which the hook pivot pin 38 extends. The hook pivots on the pivot pin between an upright, locked position in which the hook arm fits over the top of the container frame member (FIGS. 1, 6A) and an unlocked position in which the hook arm is rotated away from the frame member of the container (FIG. 6B).

The center of mass 56 of each hook 30 is located in the hook arm 52 at a point laterally offset from the pivot point 40 in the mounting base 54 when the hook is in the upright position in which it locks down the container frame member 24. Thus, the hook 30 is biased to rotate outwardly to an open position away from the container frame member. The hook 30 is retained in the upright, or locked, position, against the bias of its offset center of mass, by the striker assembly 16.

Figure 4:
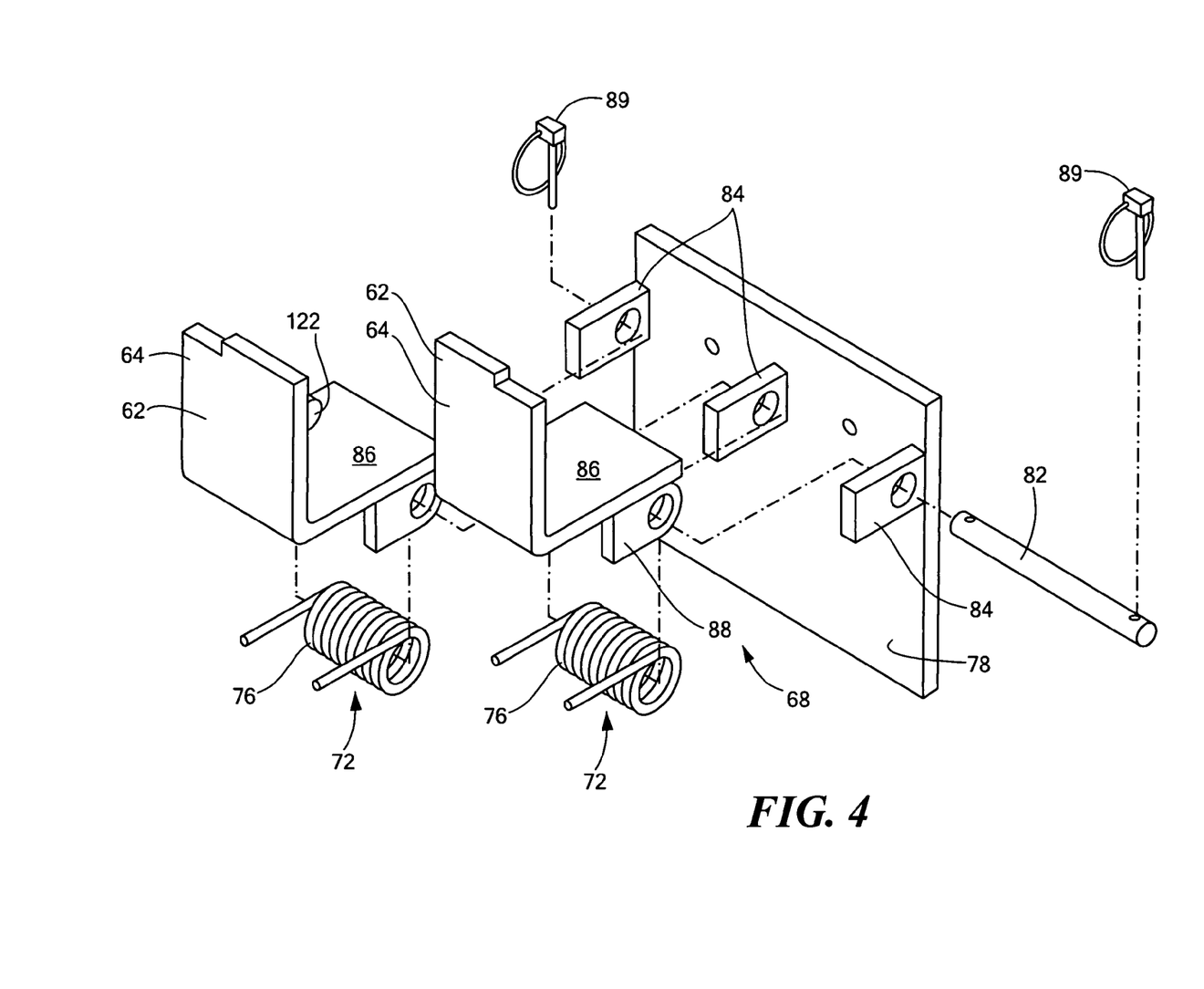
FIG. 4 is an exploded isometric view of the striker assembly of the locking system of FIG. 1.

The striker assembly 16 (FIGS. 1, 2, and 4) includes two striker elements 62, one striker element associated with each hook of the hook assembly. In the embodiment illustrated, the striker element is a plate 64 biased to extend upwardly to contact the hook 30. As the hoist frame rails 14 are lowered, the plate 64 comes into contact with its associated hook 30 along an outer edge 66 of the hook and forces the hook to rotate upwardly, against the bias of the hook's center of mass, to the locked position.

The striker element 62 is mounted via a mounting mechanism 68 to the vehicle chassis 18 and biased via a striker biasing element 72 into contact with the hook 30. Should the hook encounter an obstruction, such as a container rib member 74 (FIG. 1), that prevents movement of the hook into the locked position, the striker biasing element 72 allows movement of the striker element 62 and concomitantly the hook 30 out of the locked position.

In the embodiment shown, the biasing element includes a torsion spring 76. See FIG. 4. The striker mounting mechanism 68 includes a mounting plate 78 mounted to the chassis in any suitable manner, such as with bolts or welding. A striker element pivot pin 82 is attached to the mounting plate in any suitable manner. For example, flanges 84 extend from the mounting plate at suitable locations, such as the sides and middle. An angled leg 86 is attached to or integral with the striker plate 64. Brackets 88 depend from the leg 86. The striker element pivot pin 82 extends through openings in the brackets 88 and flanges 84 and is retained by spring clip pins 89. The torsion spring 76 is disposed over the pivot pin with its end abutting the bottom surface of the leg 86, thereby biasing the spring plate upwardly.

The spring plates 64 are each independently spring loaded to bias the plate into an upward position. Because the spring plates and hooks operate independently of each other, if one hook is blocked, the other hook is still able to rotate to the closed position and latch onto the container. For this reason, two hooks are preferred, although one hook could be provided if desired.

Figure 5A:
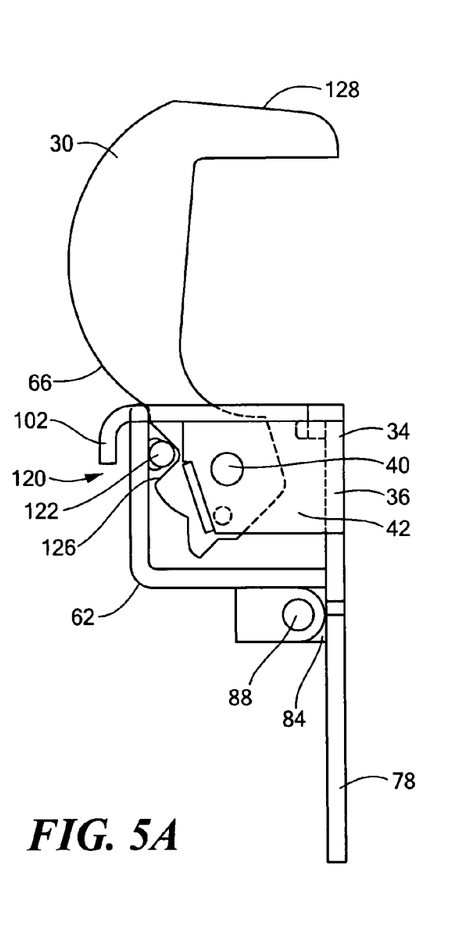
FIGS. 5A-5C illustrate an operation sequence of a positive unlocking mechanism of the locking system of FIG. 1.
Figure 5B:
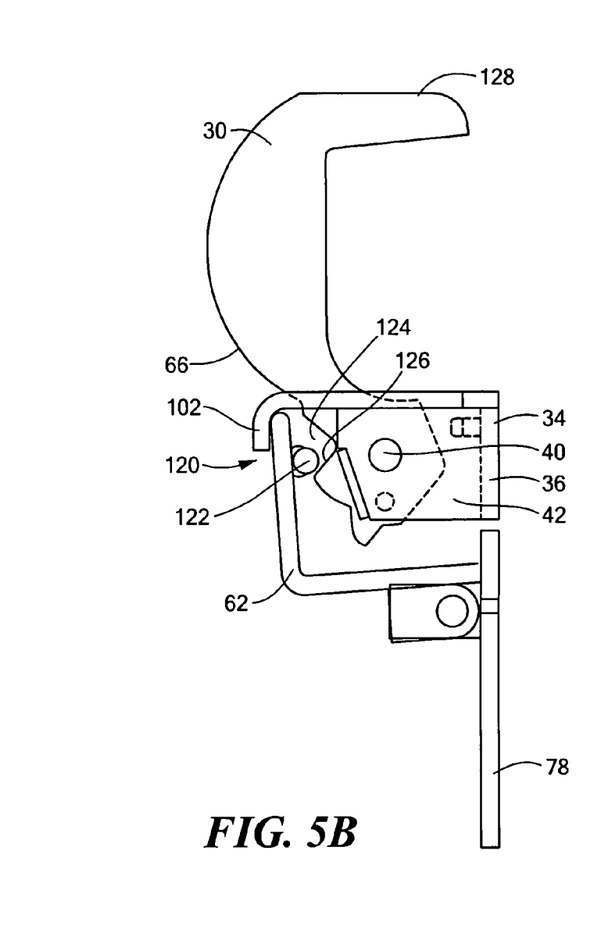
Figure 5C:
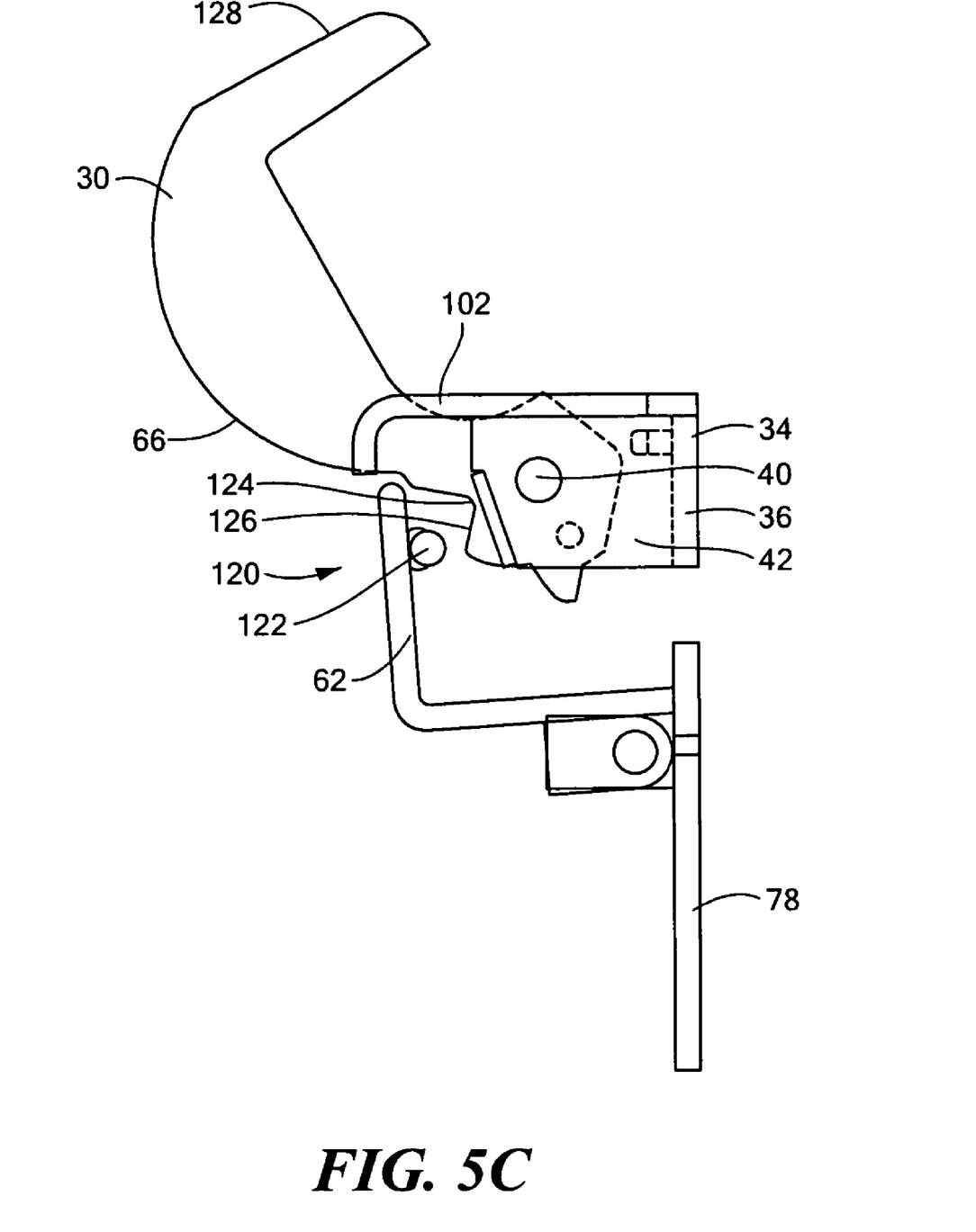

To unload a container, the hoist frame rails are raised. As the rails rise up, the hooks move out of contact with the striker assembly. The hooks fall away from the container by their own weight, because of the location of the center of mass offset laterally from the pivot point. In the event that the container binds a hook in the locked position, a positive or mechanical unlocking mechanism 120 to prevent binding is provided to overcome this binding force. In the embodiment illustrated, the binding prevention mechanism includes a pull down device, such as a round member 122 attached to the spring plate 64. The round member engages a notch 124 in one of the hooks 30 and, by pushing on a surface 126 of the notch, forces the hook downwardly as the container rises, thereby overcoming any binding force without the need for additional power, such as from the truck's hydraulic or pneumatic system. It will be appreciated that a positive or mechanical unlocking mechanism to overcome a binding force can have other configurations. The hooks also include a slight taper on the top surface 128 so that any unlocking (rolling) motion increases the clearance between the container and the hooks. The operator may operate the hoist and load and unload the container in the usual manner, and the hooks engage or disengage on their own, depending on their position in relation to the striker assembly, without the need for additional power.

The locking system includes a keeper element 102 to retain the striker element in contact with its associated hook while the vehicle is being driven. In one embodiment, the keeper element 102 is a plate 106 with a downward lip 108 at its end extending from the hoist frame rail 14. The top edge of the striker element 62 is engaged by the lip, which thereby retains the striker element in contact with the hook. Without the keeper element, the striker element could potentially fall out of contact with the hook, for example, when the vehicle bounces over rough terrain while it is being driven. In this event, the hook's center of mass would allow the hook to unlock from the container rail.

The range of rotation of the hook is such that in the locked position, an inner edge 67 of the hook is slightly over center in the locked position. See FIG. 6A. In the fully unlocked position, the hook rotates out of the way below the level of the keeper element 102. A stop 92 may be located on the mounting mechanism 32 to engage the mounting base 54 and prevent the hook from rotating over too far. See FIG. 6B. In the embodiment, shown, the full range of rotation is 126°, although it will be appreciated that this range can vary.

The invention is not to be limited by what has been particularly shown and described, except as indicated by the appended claims.

What is claimed is:

1. A locking system for locking a container to a vehicle, the vehicle including a chassis and a hoist frame liftable and lowerable to load and unload the container, the locking system comprising:

a locking assembly comprising:
  at least one hook for hooking over a portion of the container, the hook having a center of mass located to bias the hook to an unlocked position, and including an outer edge and a notch, the notch including a surface angled downwardly from horizontal when the hook is in a locked position, and
  a mounting mechanism for pivotably mounting the locking assembly to the hoist frame; and
a striker assembly comprising:
  a striker element comprising an upstanding plate mountable to the chassis, an upper edge of the plate disposed to strike the hook at a location along the outer edge of the hook to move the hook against the bias of the hook's center of mass to a locked position in which the hook is hooked over the portion of the container,
  a striker biasing element disposed for biasing the striker element into contact with the hook,
  a positive mechanism disposed for exerting a downward force on the at least one hook to overcome a binding force between the hook and the container when the container is lifted up, the positive mechanism comprising a round member mounted on the upstanding plate below the upper edge to contact the notch in the hook during lifting of the container, and
  a mounting mechanism for mounting the striker assembly to the vehicle chassis.

2. The locking system of claim 1, wherein:

the locking assembly further comprises a second hook adjacent the at least one hook for hooking over the portion of the container, the second hook having a center of mass located to bias the second hook to an unlocked position; and the striker assembly further comprises a second striker element disposed to strike the second hook at a location to move the second hook against the bias of the second hook's center of mass to a locked position in which the second hook is hooked over the portion of the container, and a second striker biasing element disposed for biasing the second striker element into contact with the second hook and for allowing movement of the second striker element away from the locked position of the second hook when the second hook encounters an obstruction preventing movement of the second hook into the locked position, and wherein the positive mechanism comprises a second round member disposed to contact a notch in the second hook.

3. A locking system for locking a container to a vehicle, the vehicle including a chassis and a hoist frame liftable and lowerable to load and unload the container from the chassis, the locking system comprising:

at least one hook for hooking to a portion of the container, the hook mounted to the hoist frame, the hook having a center of mass located to bias the hook out of hooking contact with the container;

a striker element for biasing the hook into hooking contact with the container against the bias of the center of mass, the striker element comprising an upstanding plate pivotably mounted to the vehicle chassis, the upstanding plate including an upper edge disposed to contact an outer edge of the at least one hook;

a notch disposed on the at least one hook below the outer edge and including a surface angled downwardly from horizontal when the at least one hook is in a locked position; and a round member disposed on the upstanding plate below the upper edge to contact and exert a downward force on the notch on the at least one hook for overcoming a binding force on the at least one hook from the container when the container is lifting up.

4. The locking system of claim 3, further comprising a pair of hooks, each hook independently biased into hooking contact with the container, a further round member disposed to independently contact and exert a downward force on the other hook of the pair of hooks for overcoming a binding force on the other hook from the container when the container is lifting up.

* * * * *